United States Patent [19]

Glydon

[11] Patent Number: 5,618,215
[45] Date of Patent: Apr. 8, 1997

[54] AQUATIC SPORTS BOARD

[75] Inventor: Jon A. Glydon, Barnstable, Mass.

[73] Assignee: Earth & Ocean Sports, Inc., Hyannis, Mass.

[21] Appl. No.: 370,964

[22] Filed: Jan. 10, 1995

[51] Int. Cl.[6] ............................................. B63B 1/00
[52] U.S. Cl. ........................................ 441/65; 114/67 R
[58] Field of Search ........................... 114/67 R; 441/65, 441/74

[56] References Cited

U.S. PATENT DOCUMENTS

| | | | |
|---|---|---|---|
| D. 194,646 | 2/1963 | Del Mar | D71/1 |
| D. 315,770 | 3/1991 | Shanelec | D21/228 |
| D. 345,000 | 3/1994 | Foulke | D21/228 |
| 2,910,708 | 11/1959 | Albright | 441/65 |
| 4,129,911 | 12/1978 | McDonald et al. | |
| 4,395,241 | 7/1983 | Comparetto | 441/65 |
| 4,571,195 | 2/1986 | Brooks, Jr. | 441/74 |
| 4,752,260 | 6/1988 | Stewart | 441/65 |
| 5,114,370 | 5/1992 | Moran | 441/65 |
| 5,116,269 | 5/1992 | Moran | 441/65 |
| 5,167,552 | 12/1992 | Johnson | 114/67 R |
| 5,171,623 | 12/1992 | Yee | 114/67 R |
| 5,211,593 | 5/1993 | Schneider et al. | 441/65 |

FOREIGN PATENT DOCUMENTS 2237655  2/1975  France ............................... 441/74

*Primary Examiner*—Jesus D. Sotelo
*Attorney, Agent, or Firm*—Dickinson, Wright, Moon, Van Dusen & Freeman

[57] ABSTRACT

An improved aquatic sports board is provided. The rail of the board is equipped with a plurality of apertures which are arranged in a pattern along the length of the rail. The apertures serve to reduce the drag on the bodyboard as it moves through the water.

24 Claims, 2 Drawing Sheets

AQUATIC SPORTS BOARD

TECHNICAL FIELD

This invention relates generally to the art of aquatic sports boards, and in particular to a rail for such a board.

BACKGROUND

Various types of aquatic sports boards, including body boards, surf boards, kickboards, and windsurfer boards, are known to the prior art. Such devices typically consist of a foam core covered with a surface layer. U.S. Pat. No. 3,929,549 (Smith), U.S. Pat. No. 3,802,010 (Smith), U.S. Pat. No. 4,836,814 (McDonald et al.), and U.S. Pat. No. 4,129,911 (McDonald et al.), for example, disclose aquatic boards made with a foam interior and a hardened fiberglass exterior. Other references show boards in which the foam core is provided with a skin made out of polyethylene film or foam.

It is known to decorate the skin of an aquatic board with graphics and other designs, as exemplified by U.S. Pat. No. 5,211,593 (Schneider et al.). It is also known to modify the top surface of an aquatic board with ridges, dimples and the like to improve the aesthetic appeal of the board, as in U.S. Pat. No. 5,114,370 (Moran) and U.S. Pat. No. 4,752,260 (Stewart), or to provide contours in the upper surface to improve the user's grip, as in U.S. Pat. No. 5,116,269 (Moran).

To date, various designs have been proposed for the rails on aquatic boards. The rail is the edge or side of the board which is used to control the lateral movement of the board as it passes through the water. The rail may be an integral part of the core of the board, or it may be in the form of a distinct strip or portion that is attached to the side of the board.

In some proposed designs for aquatic boards, the rails protrude outwardly. Des. 345,000 (Foulke), Des. 315,770 (Shanelec) and Des. 194,646 (Del Mar) are exemplary. The shape of these rails has the effect of increasing the surface area of the rail in contact with the water, thereby increasing the holding power of the bodyboard in the water. While this effect is desirable for certain applications, however, the increased drag attendant with such rails slows the passage of the aquatic board through the water.

Some attempts have been made to reduce the drag of an aquatic board as it passes through the water, thereby increasing its speed. One such effort has been aimed at effecting changes in the angle between the rail and the bottom of the board. Thus, U.S. Pat. No. 4,752,260 (Stewart) and U.S. Pat. No. 4,571,195 (Brooks, Jr.) disclose body boards wherein a step is provided on the rail. This step is an area of the rail that is substantially perpendicular to the bottom of the body-board. According to U.S. Pat. No. 4,752,260 (Stewart), water traveling along the hull shears off of the hull and away from the step, thereby decreasing the resistance of the bodyboard as it passes through the water and increasing its speed.

However, in practice, it has been found that aquatic boards of the type shown in U.S. Pat. No. 4,752,260 (Stewart) and U.S. Pat. No. 4,571,195 (Brooks, Jr.) still possess an amount of drag that is unacceptable for some applications. Furthermore, introduction of the step in these boards sacrifices some of the handling features enjoyed by rail profiles that are not stepped. There is thus a need for a method of reducing the drag on an aquatic board without changing the overall rail profile.

U.S. Pat. No. 4,395,241 (Comparetto) discloses an amphibious sled equipped with a perforated water catcher. The "water catcher" is a flexible sheet which is attached to each side of the front of the sled and is wrapped inwardly onto the deck of the sled during use to form a venturi. The perforations on the water catcher serve to reduce drag or wave turbulence.

However, the use of a water catcher is inconvenient for most aquatic boards, since its use is limited primarily to the surf, and since it interferes with the rail profile. Furthermore, water catchers require skillful manipulation by the user to attain desirable results, and do not improve the speed generated by the rails of an aquatic device. Also, since water catchers operate by forming a venturi which allows the device to which they are attached to be pulled by a wave, they do not improve the speed of an aquatic board while it is being pushed by a wave, and in fact reduce the speed generated by the rails of an aquatic device by increasing the overall surface area at the front of the board.

Surprisingly, it has been found that the speed of an aquatic board can be increased by introducing one or more apertures into the rails of the board. Without being bound by any particular scientific theory, it appears that the apertures reduce the surface area of the rail that is exposed to the water, thus reducing the drag.

SUMMARY OF THE INVENTION

The present invention is an improved rail for aquatic boards. The rail is equipped with one or more apertures that are disposed along the length of the rail. The apertures serve to reduce the drag on the board as it moves through the water.

DETAILED DESCRIPTION OF THE PREFERRED EMBODIMENT

Figure 1:
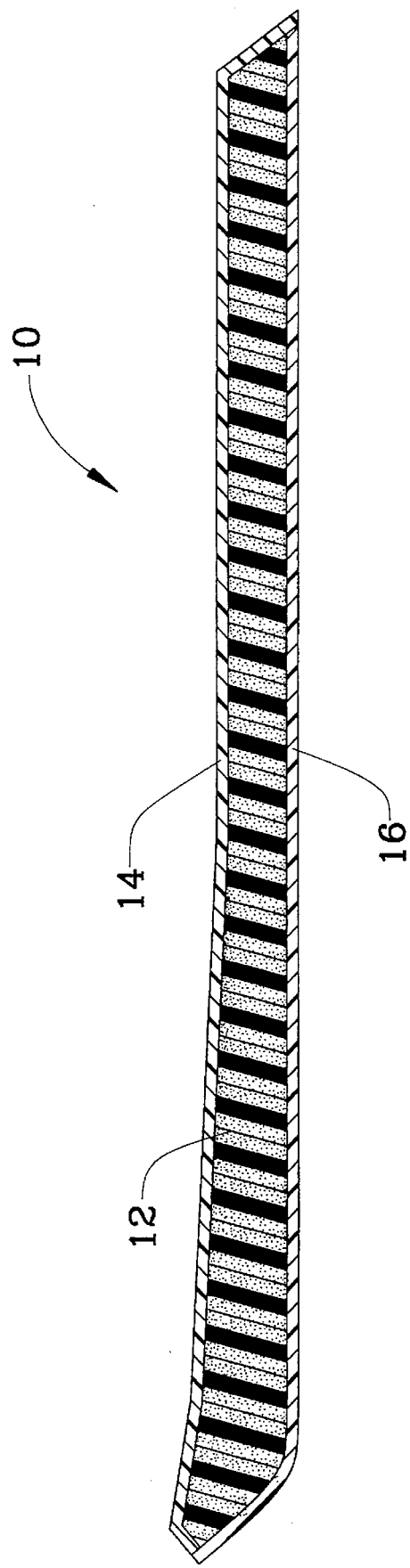
FIG. 1 is a side view in section of the aquatic board of the present invention.

FIG. 1 illustrates the interior construction of the aquatic board 10 of the present invention. The board has a core 12 to which is affixed a top surface layer 14 and a bottom surface layer 16. The top and bottom surface layers may be provided with designs, decals, and other effects that improve the aesthetic appearance of the board.

The core, which is typically about 2" thick, may be made out of one or more layers of foamed low density polyethylene or a similar buoyant material. The core may be any suitable color or, if the core consists of more than one layer, the various layers may be of different colors. Methods of making these cores, and suitable core materials, are well known to the art and are described, for example, in U.S. Pat. No. 4,836,814 (McDonald et al.).

The top surface layer 14 is typically about 0.125" thick and is securely bonded to the core, either through heat lamination or through the use of a suitable adhesive. This layer may consist of one or more layers of a film or foam that is somewhat denser than the core material. Preferably, the top surface layer is made from a polyethylene film or foam of a type that can be securely affixed to the underlying core.

The top surface layer is preferably of a texture that is sufficiently pliable and provides sufficient friction so that the user may maintain a proper grip on the board during use. A variety of materials are known to the art that are suitable for this purpose. One such material is a thermoplastic foam made from cross-linked low density polyethylene which is commercially available in sheets from Sentinel Products Corporation, Hyannis, Mass.

The material used for the top surface layer has a density which is preferably about 6 lb/ft$^3$, as compared to the density of the core which is preferably about 1.7–2 lb/ft$^3$. The top surface layer may be further provided with handgrips or body contours that allow the user to more easily maintain a position on the board.

The bottom surface layer 16, which is typically about 0.125" thick, is preferably constructed out of a material that is sufficiently tough to resist the abrasion of sand. A number of materials suitable for this purpose are known to the art and include, for example, medium to high density polyethylene film. The bottom of the board may also be provided with fins, channels, and other features as are known to the art and which improve the operation or handling characteristics of the board.

Figure 2:
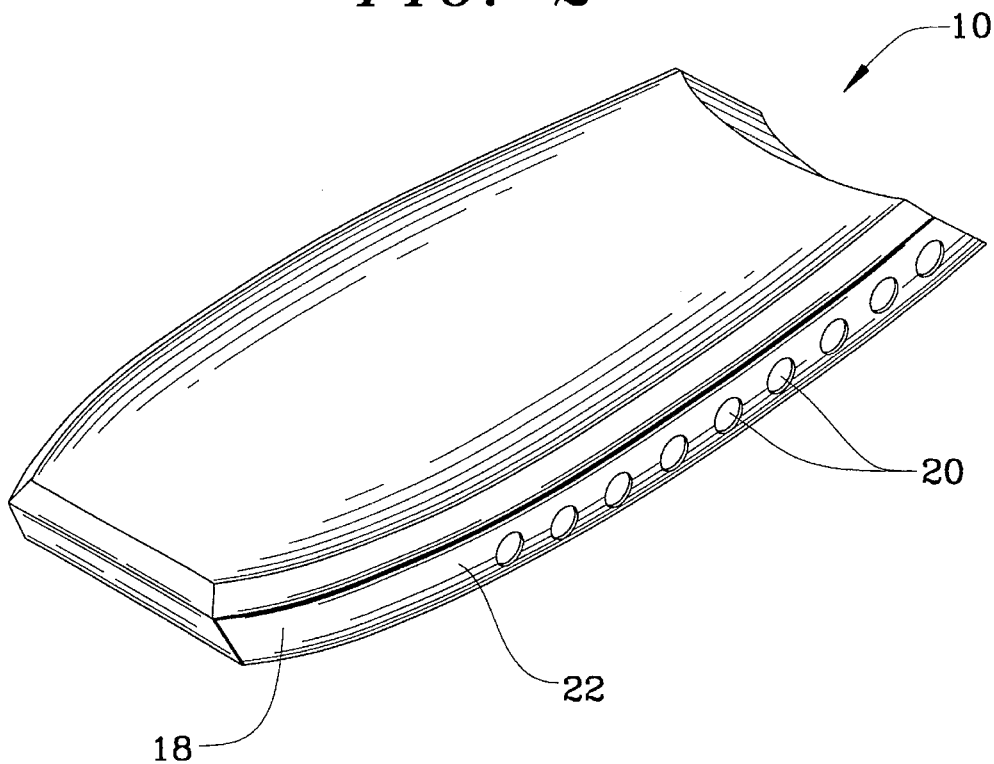
FIG. 2 is a perspective view of the rail of an aquatic board made in accordance with the method of the present invention.
Figure 3:
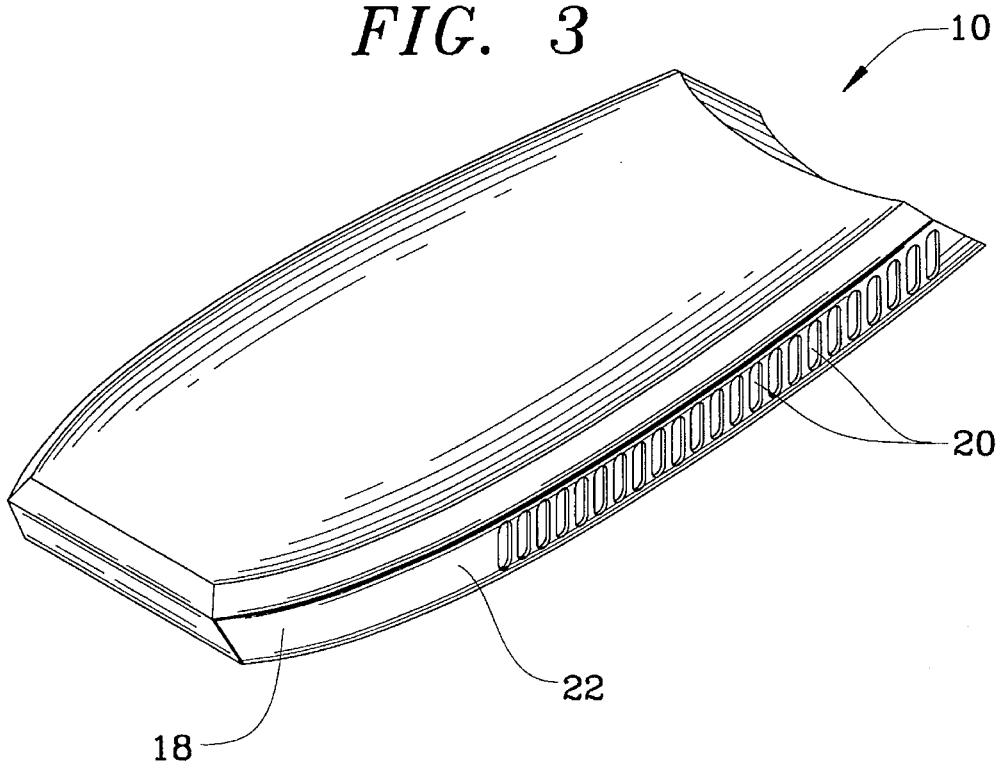
FIG. 3 is a perspective view of a second embodiment of the rail of an aquatic board made in accordance with the present invention.

Referring to FIGS. 2–3, the rails 18 of the board are provided with one or more apertures 20. As previously noted, the rail may be an integral part of the core material, in which case the apertures may be formed directly into the core through the use of drills, punches, cutting knives, or similar instruments as are known to the art. However, it is preferred that the apertures are formed in a separate rail 22 which is then attached to the core through heat lamination or through the use of a suitable adhesive.

The rail of the present invention may be constructed out of hardened or soft materials, and may be used in conjunction with both hardened and soft core materials. Any core material exposed through the apertures may be heat sealed or otherwise treated to achieve desired surface characteristics or aesthetic effects.

When separate rails are used, it is preferred that the apertures are formed in the rail material before the rail is attached to the core. This may be accomplished through the use of drills, punches, cutting knives, or similar instruments as are known to the art. However, it is preferred that the apertures are thermoformed, pressed, or die cut into the rail material before the rail is assembled, particularly when the rails are constructed out of a hardened material such as fiberglass. Various methods for thermoforming, pressing, and die cutting fiberglass and other suitable rail materials are well known to the art.

The material of the rail may be the same as, or different from, the material used for the top or bottom surface layers, and may be hard or soft. For example, this material may be composed of polyethylene film (i.e., "slick skin") or foam, or a combination of the two (i.e., a polyethylene film which is laminated or extrusion coated onto foamed polyethylene or a similar foamed substrate), that is denser than the core material, and capable of forming a strong bond to the core material. The rail is typically about 0.125" thick, although other thicknesses may be suitable for particular applications.

In the preferred embodiment, the rail consists of two layers of material which are affixed together by lamination, through the use of a suitable adhesive, or by other methods as are known to the art. The apertures are formed in the outer layer or "outer rail". This may be accomplished, for example, by molding, thermoforming, or pressing a series of apertures into a sheet of material from which the outer rail is cut. The outer rail is then attached to an inner layer or "inner rail" that is devoid of apertures.

The rail may be of various geometries, as may be suitable for the intended use of the board into which the rail is to be incorporated. However, it is preferred that at least the lower edge of the rail is sharpened to facilitate steering.

The apertures may be of any suitable shape. Thus, for example, the apertures may be approximately circular, as in FIG. 2, or approximately rectangular, as in FIG. 3. In some cases, the geometry of the aperture may be dictated by the intended application. While it is preferred that these apertures are positioned at periodic intervals along the side of the board, it may be advantageous in certain applications to group the apertures together in clusters or to position them at random intervals along the length of the board.

Various methods and devices are known to the art which may be utilized to adhere the rail to the core. For example, the rail may be adhered to the core through the use of a suitable adhesive. Preferably, however, the rail is heat laminated to the core through the use of a heat nozzle or other heating element. Such a heat nozzle may be used in conjunction with a cooling system that cools the portion of rail already attached to the core while the remaining portion of the rail is being attached.

One laminator suitable for this operation is a 24 kw at 480 v AC 3 phase laminator equipped with a Watlow heating element. In use, the core is fed past the heating element at a speed of about 8–16 ft/min. The heater heats the surface of the core material in the area to which the rail will be attached to about 550°–650° F. The heated core and the rail are then pressed together by passing them between a platen or a similar device which applies a positive pressure to the adjoined surfaces.

The heating element used with the present invention is preferably a wand heater which is set at a small angle (preferably about 25°) to the core material, and which allows the heat to blow directly onto the core material during the lamination process. This causes the thermoplastic of the exposed core material to flow, resulting in a superior bond between the core and the rail material. The flow of the thermoplastic material also serves to heat seal the surface of the core material, thereby smoothing the surface of any portion of the core material which is exposed through the apertures. Without heat sealing, the surface of this material would tend to have a number of open foam cells that would make the exposed surface porous and unattractive. As a result of the heat sealing, however, these open cells are sealed and the exterior of the board is smoother, more aesthetically appealing, and more water resistant.

The platen on the laminator is adjusted so that it will apply a positive pressure to the rail and the core during the lamination process. This promotes a tight bond between the two materials, and prevents the rail from pulling away from the core along the edges of the apertures.

Example

The following example illustrates the preferred process of constructing a bodyboard in accordance with the present invention.

A strip of cross-linked LDPE foam is provided to serve as the rail. The foam has a density of about 6 lb/ft$^3$, and a thickness of about 0.125". The rail is fed through a machine press which stamps a pattern of apertures into the rail material.

Next, a core is provided which is made of cross-linked LDPE foam having a density of about 2 lb/ft³ and a thickness of about 2". A bottom surface layer of semi-rigid HDPE having a thickness of about 0.125", and a top surface layer of cross-linked LDPE foam having a density of about 6 lb/ft³, are laminated to the core.

The core (with the top and bottom surface layers attached) and the rail are fed through a laminator at a speed of about 12 ft/min. The laminator is provided with a heating wand which is set at a 25° angle to the core material and which heats the sides of the core, in the area in which the rail will be attached, to about 650° F. After the core passes beneath the heating wand, the rail is positioned on the core, and the two surfaces are pressed together by passing them against a platen which applies a positive pressure to the adjoining surfaces.

After the core and the rail have cooled, the resulting bond between them is strong, and there is no tendency for the rail to pull away from the core. The core material exposed through the cut-out is smooth, with very few open cells.

The above disclosure is intended only to convey an understanding of the present invention to those skilled in the art, and is not intended to be limiting. It will be appreciated that various modifications to the disclosed embodiments are possible without departing from the scope of the invention. Therefore, the scope of the present invention should be construed solely by reference to the appended claims.

I claim:

1. An aquatic sports board comprising:

a buoyant core;

a rail disposed on a side of said core; and a plurality of apertures spaced along said rail.

2. The board of claim 1, wherein said rail protrudes outwardly from said side.

3. The board of claim 1, wherein said top and said bottom are essentially flat, and define respective upper and lower boundaries for said rail.

4. The board of claim 1, wherein said core comprises foamed polyethylene.

5. The board of claim 1, wherein said rail is essentially flat.

6. The board of claim 1, wherein said rail is approximately perpendicular to said top and said bottom.

7. The board of claim 1 wherein said apertures are slit-like.

8. The board of claim 1, wherein said apertures are approximately circular.

9. The board of claim 1, wherein said rail comprises a material selected from the group consisting of polyethylene film and polyethylene foam.

10. The board of claim 1, wherein said rail has a sharpened edge.

11. The board of claim 1 wherein said apertures are evenly spaced along said rail.

12. An aquatic sports board, comprising:

a flattened core having a top, a bottom, a side, and a rail mounted on said side; and a plurality of apertures spaced along said rail.

13. The board of claim 12, wherein said rail is distinct from said core, and is mounted on said side.

14. The bodyboard of claim 12, wherein said apertures are approximately rectangular.

15. The bodyboard of claim 12, wherein said apertures are rounded.

16. The bodyboard of claim 12, wherein said apertures are evenly spaced along the length of said rail.

17. The bodyboard of claim 12, wherein said rail comprises a material selected from the group consisting of polyethylene foam and polyethylene film.

18. In combination with an aquatic sports board having a top, a bottom and a side, a rail mounted on a side of said board, said rail comprising:

a longitudinal strip; and a plurality of apertures spaced along said strip.

19. The combination of claim 18, wherein said strip comprises a film disposed on a foam substrate.

20. The combination of claim 19, wherein said film and said foam comprise polyethylene.

21. A sports device comprising:

a top, a bottom and a side;

a buoyant component;

a rail disposed on said side;

and a plurality of apertures spaced along said rail.

22. The sports device of claim 21 wherein said sports device is an aquatic sports device.

23. The sports device of claim 22 wherein said aquatic sports device is substantially planar.

24. The sports device of claim 21 wherein said side is a side of said buoyant component.

* * * * *